US010366120B2

(12) United States Patent
Burgis

(10) Patent No.: US 10,366,120 B2
(45) Date of Patent: Jul. 30, 2019

(54) DYNAMIC JUKEBOX

(71) Applicant: PAYPAL, INC., San Jose, CA (US)

(72) Inventor: Jakub Ceiran Burgis, London (GB)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 15/436,676

(22) Filed: Feb. 17, 2017

(65) Prior Publication Data

US 2017/0300568 A1    Oct. 19, 2017

Related U.S. Application Data

(63) Continuation of application No. 14/231,483, filed on Mar. 31, 2014, now Pat. No. 9,575,967.

(51) Int. Cl.
| | |
|---|---|
| *G06F 16/635* | (2019.01) |
| *G06F 16/638* | (2019.01) |
| *G06F 3/16* | (2006.01) |
| *H04W 4/00* | (2018.01) |
| *G06F 16/40* | (2019.01) |
| *H04W 4/02* | (2018.01) |
| *G06Q 30/02* | (2012.01) |
| *H04W 4/80* | (2018.01) |

(52) U.S. Cl.
CPC ............ *G06F 16/635* (2019.01); *G06F 3/165* (2013.01); *G06F 16/40* (2019.01); *G06F 16/637* (2019.01); *G06F 16/639* (2019.01); *G06Q 30/0269* (2013.01); *H04W 4/00* (2013.01); *H04W 4/02* (2013.01); *H04W 4/80* (2018.02)

(58) Field of Classification Search
CPC ......... G06F 17/30053; G06F 17/30072; G06F 17/3002; G06F 17/30789; G06F 17/30749; G06F 17/30752; G06F 17/30766; G06F 16/635; G06F 16/637; G06F 16/639
See application file for complete search history.

(56) References Cited

U.S. PATENT DOCUMENTS

| | | | |
|---|---|---|---|
| 9,575,967 B2 * | 2/2017 | Burgis | ..................... H04W 4/00 |
| 2007/0244880 A1 * | 10/2007 | Martin | .............. G06F 17/30038 |
| 2008/0052371 A1 | 2/2008 | Partovi et al. | |
| 2009/0328087 A1 * | 12/2009 | Higgins | ................. H04N 7/173 |
| | | | 725/10 |
| 2010/0037752 A1 * | 2/2010 | Hansson | ........... G06F 17/30743 |
| | | | 84/601 |
| 2010/0070490 A1 | 3/2010 | Amidon et al. | |
| 2012/0290653 A1 * | 11/2012 | Sharkey | ................ H04W 4/023 |
| | | | 709/204 |
| 2013/0311464 A1 | 11/2013 | Nix et al. | |
| 2014/0031961 A1 | 1/2014 | Wansley et al. | |

* cited by examiner

*Primary Examiner* — Andrew C Flanders
(74) *Attorney, Agent, or Firm* — Haynes and Boone, LLP

(57) ABSTRACT

Methods and systems for improving a music experience are described. Multiple users can provide their musical preferences (e.g., favorite artist, group, genre, era, etc.). When the users come within the vicinity of a jukebox, the users' musical preferences are retrieved or determined. Using the combined or shared preferences of the users in the vicinity of the jukebox, the system is able to create or adjust the current playlist of songs, tailoring the music played based on the users listening nearby.

20 Claims, 3 Drawing Sheets

DYNAMIC JUKEBOX

CROSS REFERENCE

This application is a continuation of U.S. patent application Ser. No. 14/231,483, filed Mar. 31, 2014, which is hereby incorporated by reference in its entirety.

BACKGROUND

Field of the Invention

The present invention generally relates to the playing of music based on the preferences of nearby users.

Related Art

Listening to music out loud can be a social activity that involves friends, family, strangers, co-workers, and the like. For example, in a household, people may play music out loud at parties and other social gatherings. In another example, at a shopping mall, music may be played in public areas.

Jukeboxes having several songs available for selection and play are generally well known in the art. As with game amusement devices, jukeboxes typically operate upon input of currency and are installed in locations such as bars, restaurants, airports, shopping malls, video arcades, casinos or the like. Upon receipt of currency, a user is prompted to select one or more songs for play, typically over a public speaker system installed in the location of the jukebox. As such, the jukebox plays the song selected by a single user, rather than the song preferred by the majority of the users in the vicinity of the jukebox. Typical jukeboxes have little means of accommodating the tastes and preferences of several users.

Thus, a need exists for systems and methods that improve the music experience of users.

Figure 1:
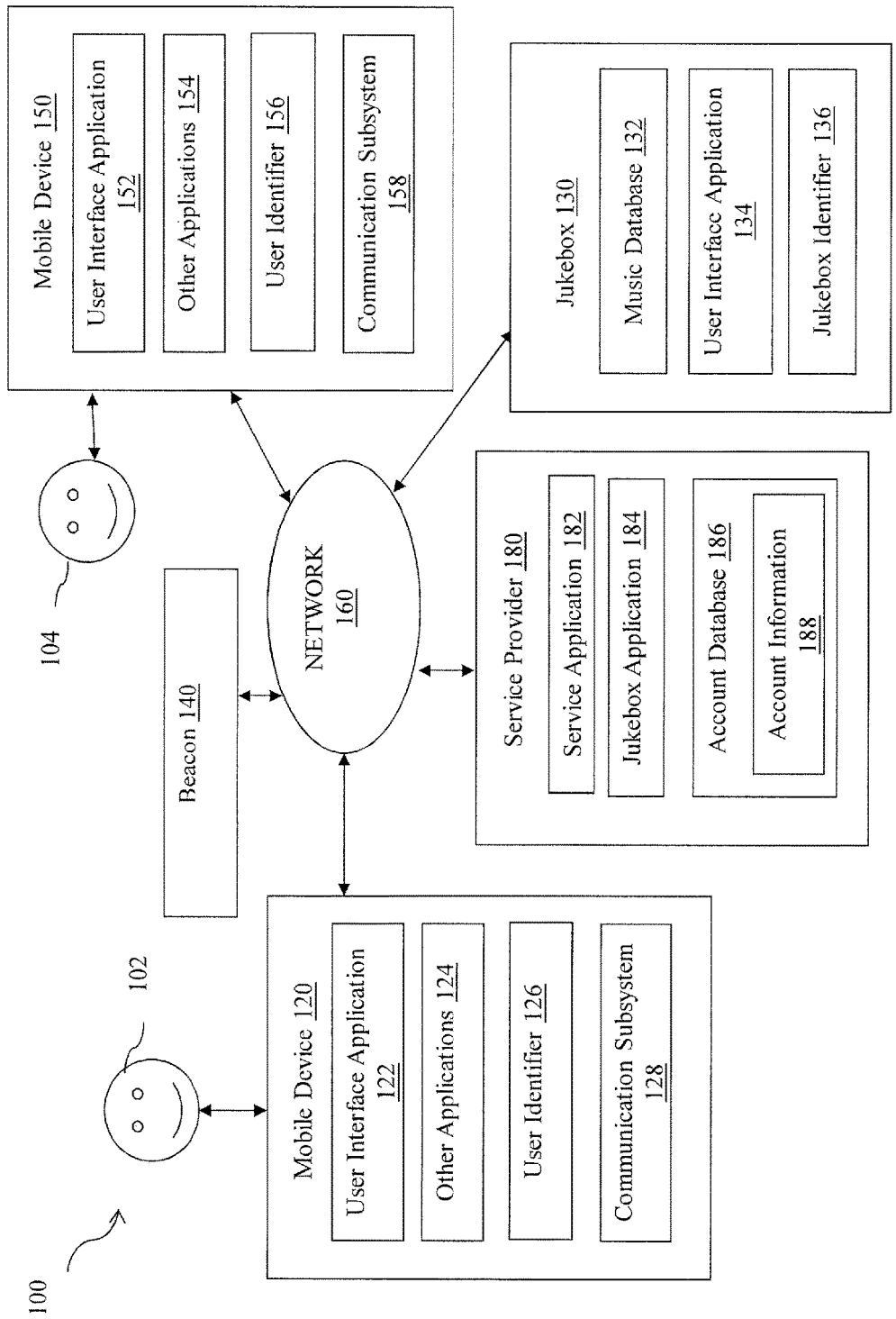
FIG. 1 is a block diagram illustrating a system for improving a music experience of a user according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that dynamically create and adjust music playlists based on the musical preferences of users in the area of a jukebox. As used herein, "jukebox" can be any device that plays or outputs music, including a speaker or speaker system. Using the combined or shared preferences of the users in the vicinity of the jukebox, the system is able to create or adjust the current playlist of songs, tailoring the music played based on the users listening nearby.

Multiple users can provide their musical preferences (e.g., favorite artist, group, genre, era, etc.) to the system, and the system associates these musical preferences with a specific user ID. In another embodiment, the system determines the musical preferences. When the users come within the vicinity of a jukebox and a beacon, the users' mobile device pairs with the beacon. The beacon determines the user IDs associated with the users near the jukebox and beacon, the user IDs are transmitted to the system, and the system retrieves or determines the musical preferences of the users. The system selects songs to play based on these musical preferences and transmits the selected songs to the jukebox. In various embodiments, the selected songs are adjusted based on location, identity of the users, time of the day, and/or time of the year.

FIG. 1 shows one embodiment of a block diagram of a network-based system 100 adapted to improve a music experience for users, such as users 102 and 104. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a first mobile device 120 (e.g., a smartphone), a jukebox device 130, a beacon 140 (e.g., a radio frequency beacon or Bluetooth Low Energy (BLE) beacon), a second mobile device 150 (e.g., a smartphone) and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The first mobile device 120 and second mobile device 150, in one embodiment, may be utilized by the first user 102 and the second user 104 to interact with the service provider server 180 over the network 160. For example, users 102 and 104 may conduct financial transactions (e.g., account transfers) with the service provider server 180 and with each other via the user devices 120 and 150.

The mobile devices 120 and 150 are configured to perform one or more tasks when mobile devices 120 and 150 are located in proximity to the beacon 130. The task to be performed can include, for example, launching an application program, setting certain files to non-accessible mode, initiating a phone call, sounding an alarm, storing a message, displaying a message, etc.

The first mobile device 120 and second mobile device 150, in various embodiments, may be implemented using any appropriate combination of hardware and/or software configured for wired and/or wireless communication over the network 160. The first mobile device 120, in one embodiment, may be utilized by the first user 102 to interact with the service provider server 180 over the network 160. For example, the first user 102 may conduct financial transactions (e.g., account transfers, bill payment, etc.) with the service provider server 180 via the first mobile device 120. The second user device 150, in turn, may be used by the second user 104 to interact with the service provider server 180. In various implementations, the mobile devices 120, 150 may include a wireless telephone (e.g., cellular or mobile phone), a tablet, a wearable computing device, a personal computer, a notebook computer, and/or various other generally known types of wired and/or wireless computing devices.

The first mobile device 120, in one embodiment, includes a user interface application 122, which may be utilized by the first user 102 to conduct transactions (e.g., shopping, purchasing, bidding, etc.) with the jukebox device 130 or the service provider server 180 over the network 160. In one aspect, purchase expenses may be directly and/or automatically debited from an account related to the first user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the first user 102 is able to purchase music from the one or more jukebox devices 130 via the service provider server 180. Accordingly, in one or more embodiments, the first user 102 may conduct transactions (e.g., purchase and provide payment for one or more songs) from the one or more jukebox devices 130 via the service provider server 180.

The first mobile device 120, in various embodiments, may include other applications 124 as may be desired in one or more embodiments of the present disclosure to provide additional features available to first user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the first user 102 based on activity from the first mobile device 120 (e.g., cell phone), and for the second user 104 based on activity from the second mobile device 150. The user profile may be updated with each financial and/or information transaction (e.g., payment transaction, purchase transaction, etc.) achieved through use of the mobile devices 120 and 150. In various aspects, this may include the type of transaction and/or the location information from the mobile devices 120 and 150. As such, the profile may be used for recognizing patterns of potential fraud, setting transaction limits on the user, etc.

The first mobile device 120, in one embodiment, may include at least one user identifier 126, which may be implemented, for example, as operating system registry entries, cookies associated with the user interface application 122, identifiers associated with hardware of the first mobile device 120, or various other appropriate identifiers. The user identifier 126 may include one or more attributes related to the first user 102, such as personal information related to the first user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the first user 102 with a particular user account maintained by the service provider server 180. In various embodiments, the user identifier 126 is associated with the musical preferences of the first user 102.

In some embodiments, the first mobile device 120 includes a communication subsystem 128, which can include radio frequency receivers and transmitters and/or optical (e.g., infrared) receivers and transmitters. The specific design and implementation of the communication subsystem 128 can depend on the communication network over which the first mobile device 120 is intended to operate. For example, the first mobile device 120 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network.

In an exemplary embodiment, the first mobile device 120 includes a library containing music purchased by the first user 102. The library, in various embodiments, may be accessed by the service provider server 180 to determine musical preferences of the first user 102.

Second mobile device 150 may have similar applications and modules as first mobile device 120. Second mobile device 150 may also include a user interface application 152 and one or more other applications 154 which may be used, for example, to provide a convenient interface to permit second user 104 to browse information over network 160. For example, in one embodiment, user interface application 152 may be implemented as a web browser configured to view information available over the Internet and communicate with service provider server 180.

Second mobile device 150 may further include other applications 154 such as security applications for implementing client-side security features, programmatic client applications for interfacing with appropriate application programming interfaces (APIs) over network 160, or other types of applications. Applications 154 may also include email, text, IM, and voice applications that allow second user 104 to communicate through network 160, and create and manage funding sources. Second mobile device 150 includes one or more user identifiers 156 which may be implemented, for example, as operating system registry entries, cookies associated with user interface application 152, identifiers associated with hardware of second mobile device 150, or other appropriate identifiers, such as used for payment/recipient/device authentication, e.g., the phone number associated with second mobile device 150. Identifiers may be used by a service provider to associate second user 104 with a particular account maintained by the service provider and musical preferences of the second user 104. Second mobile device 150 further includes a communication subsystem 158 and a music library.

The jukebox device 130 is generally located in a bar, restaurant, club, or other desired location, such as a store, an office, a house, or even an area (e.g., containing a booth or exhibit within a field or convention center), and is operable to play or deliver music. As such, the jukebox device 130 typically includes speakers. The one or more jukebox devices 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc. In some embodiments, business entities may need registration of the user identity information as part of offering items (e.g., music) to the first user 102 and/or the second user 104 over the network 160. As such, each of the one or more jukebox devices 130 may include a music database 132 for identifying music for sale or play, which may be made available to the mobile devices 120 and 150 for viewing and purchase or listening by the first user 102 and/or the second user 104. In one or more embodiments, users 102 and 104 may complete a transaction such as purchasing the music via service provider server 180.

The music database 132, in various embodiments, contains a library of audio content and audiovisual content (typically music and associated video or graphics). In one embodiment, the music database 132 is periodically updated with new or popular songs. The updating may occur remotely, or it may be updated manually by, for example, an operator using an update tool provided by the entity controlling the jukebox device 130.

The jukebox device 130, in one embodiment, also includes a user interface application 134. In some embodiments, the jukebox device 130 may receive, store, and/or display a graphical user interface (GUI). The GUI may display a listing of the music tracks that are stored in the music database 132 and available for playback. Additionally, the GUI may provide a screen or portion of a screen that displays the currently playing music track.

Each of the jukebox devices 130, in one embodiment, may include at least one jukebox identifier 136, which may be included as part of the one or more songs made available for purchase so that, e.g., particular songs, are associated with particular jukebox devices 130. In one implementation, the jukebox identifier 136 may include one or more attributes and/or parameters related to the entity controlling the jukebox 130, such as business and banking information. In various embodiments, users 102 and 104 may conduct transactions (e.g., searching, selection, monitoring, purchasing, and/or providing payment for songs) with each jukebox device 130 via the service provider server 180 over the network 160.

Beacon 140 may be set up by merchants or individuals offering various items, such as products and/or services for sale. As defined herein, a "beacon" is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 140 is typically maintained by one or more service providers. When first user 102 or second user 104 comes in range of beacon 140, a mobile application on the first mobile device 120 or second mobile device 150 run by a service provider can wake up and connect to the beacon 140. Mobile devices 120 and 150 can then receive messages from beacon 140 and communicate with beacon 140. In some implementations, beacon 140 is a BLE beacon.

Beacon 140 can output a wireless signal that can be detected by mobile devices 120 and 150 when mobile devices 120 and 150 are within a certain proximity of the beacon 140. Beacon 140 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 140 can be adjusted to communicate only within a desired range, which may depend on intended message ranges. Mobile devices 120 and 150 are configured to detect the transmitted signals from beacon 140, such that when mobile devices 120 and 150 are located within the transmission range of beacon 140, the signal may be detected.

The service provider server 180, in one embodiment, may be maintained by a transaction processing entity, which may provide processing for financial transactions and/or information transactions between the first user 102, the second user 104, jukebox device 130, and beacon 140. As such, the service provider server 180 includes a service application 182, which may be adapted to interact with the first mobile device 120, second mobile device 150, jukebox device 130, and/or beacon 140 over the network 160. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., users 102 and 104) and merchants. For example, account information 188 may include private financial information of users 102 and 104, such as one or more account numbers, passwords, credit card information, banking information, or other types of financial information, which may be used to facilitate financial transactions between users 102 and 104 and a merchant. In various aspects, the methods and systems described herein may be modified to accommodate users and/or merchants that may or may not be associated with at least one existing user account and/or merchant account, respectively.

In one implementation, the users 102 and 104 may have identity attributes stored with the service provider server 180, and users 102 and 104 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate users 102 and 104 with one or more particular user accounts maintained by the service provider server 180.

In various embodiments, service provider server 180 includes a jukebox application 184. The jukebox application 184 can provide personalized music to the first user 102 and/or second user 104, recommend music likely to be appealing to the first user 102 and/or second user 104, and bill first user 102 and/or second user 104 for music purchases. In some embodiments, the jukebox application 184 collects and stores musical preferences of the first user 102 and second user 104. For example, the jukebox application may build up or compile a list of the first user 102 and second user 104's preferred songs. Specifically, the jukebox application 184 can determine user preferences based on the user 102 or user 104's selection of one or more tracks from a particular category, a particular artist, a particular album, a particular time period (e.g., the 80's), and/or a particular genre. The jukebox application 184 can also analyze the music stored on the first mobile device 120 and/or second mobile device 150. From that information, the jukebox application 184 and determine what kind of music the users 102 and 104 enjoy listening to.

Figure 2:
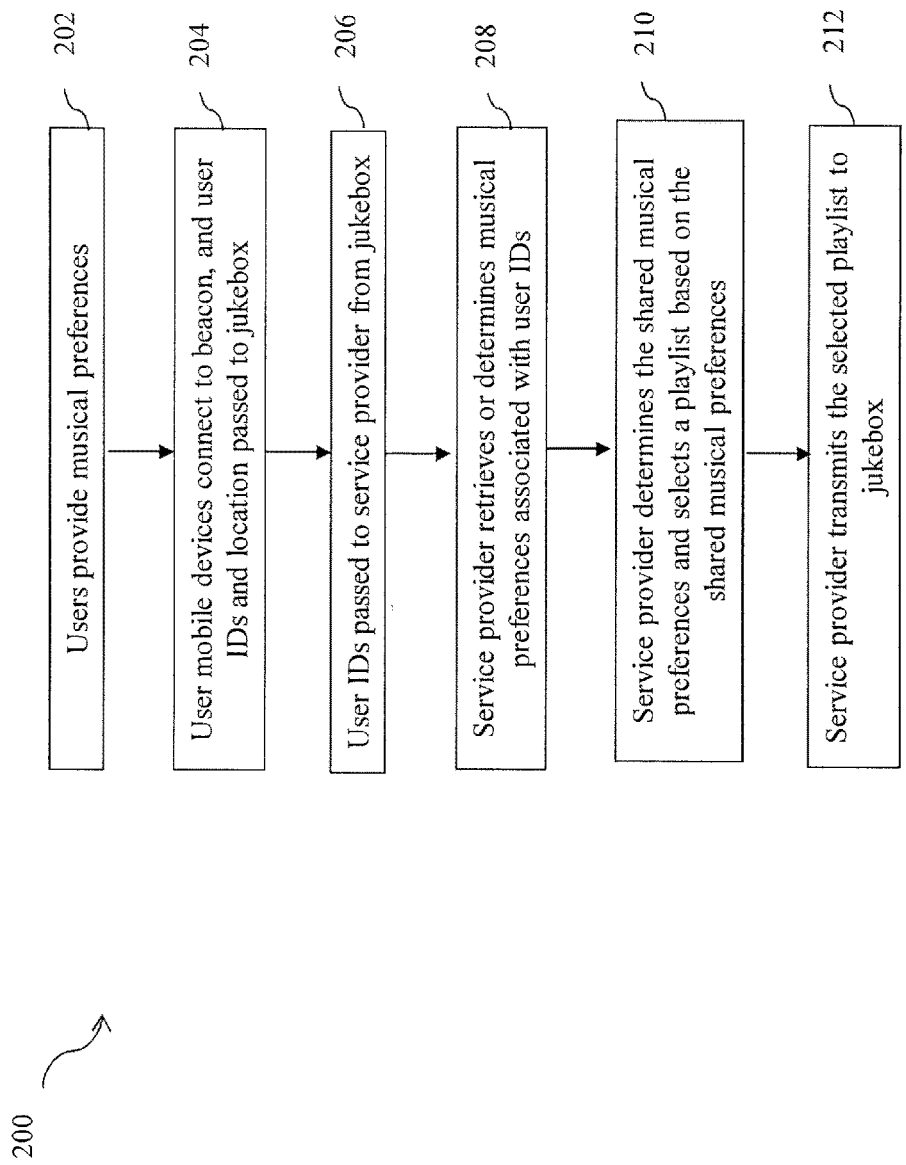
FIG. 2 is a flowchart showing a method for improving a music experience of a user according to an embodiment of the present disclosure.

Referring now to FIG. 2, a flowchart 200 of a method for improving a music experience for a user is illustrated according to an embodiment of the present disclosure. In various embodiments, the users 102 and 104 register with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

At step 202, the first user 102 and second user 104 each provide various musical preferences, e.g., favorite artists, albums, songs, genres, themes, etc. For example, the first user 102 or second user 104 can manually enter musical preference information or select options from drop-down menus. In another example, the first user 102 or second user 104 links an external data source such as Spotify, Pandora, Last.fm, etc. to provide his or her musical preferences. In various aspects, the first user 102 and second user 104's musical preferences are associated with a user ID. In some embodiments, the users 102 and 104 can also specify the kind of music he or she does not enjoy or does not want to hear.

In another embodiment, the musical preferences are determined by the service provider server 180, without any input from the first user 102 or the second user 104. The service provider server 180 can access the music library on the first mobile device 120 and second mobile device 150, analyze the music stored in the library, and determine what kinds of songs or artists the first user 102 and second user 102 prefer to listen to. The service provider can also use past purchases and/or searches of music, concert tickets, and festivals, as well as information from social networks, such as events the users 102 and 104 have attended or music the users 102 and 104 like.

When first user 102 and second user 104 enter the vicinity of beacon 140, at step 204, first mobile device 120 and second mobile device 150 each make a connection with beacon 140, and beacon 140 passes mobile device details (e.g., user identifier 126 and user identifier 156) and location information to jukebox device 130. In one embodiment, once the mobile device 120 or 150 is connected to the beacon 140, first user 102 or second user 104 can choose to purchase a song on the jukebox device 130 and immediately hear the purchased song.

The jukebox device 130 is also in the vicinity of the first user 102 and second user 104, and in an area where music played by the jukebox device 130 can be heard by both the first user 102 and the second user 104. In various embodiments, the jukebox device 130 and the beacon 140 are substantially in the same location (e.g., same building) or are close to each other (e.g., within about 5 to about 10 feet of each other). For example, there may be a beacon 140 in each room of a restaurant, and the jukebox device 130 may be located in a central location of the restaurant. In another example, a beacon 140 may be present in different rooms of a house, and the jukebox device 130 may be located in the living room where the different rooms in the house can hear the music.

The beacon 140 senses first user 102 and second user 104's presence by way of electronic communication with first mobile device 120 and second mobile device 150. As such, first user 102 and second user 104's specific location can be determined using beacon 140. Once the location of the first user 102 and second user 104 are determined, the beacon 140 communicates with the jukebox device 130 in the area of the first user 102 and the second user 104.

At step 206, the jukebox device 130 transmits the user ID of the first user 102 and the user ID of the second user 104 to service provider server 180. At step 208, the service provider server 180 retrieves or determines the musical preferences associated with each user ID. In this way, musical preferences for a plurality of users are compiled and collected by the service provider server 180.

At step 210, the service provider server 180 determines the shared music preferences of the plurality of users (e.g., first user 102 and second user 104) and selects a playlist to play on the jukebox device 130 based on the shared musical preferences. For example, the first user 102 may enjoy hard rock, country music, dance music, and hip hop. The second user 104 may enjoy new wave music, pop music, reggae, blues, and classical music. Based on these user preferences, the service provider server 180 may decide that dance-pop music, such as music by Michael Jackson, Lady Gaga, Janet Jackson, Pet Shop Boys, or Madonna, would satisfy both the first and second users.

In various embodiments, the server 180 may be provided with an algorithm or other method to adjust the selected music based on the time of day (e.g., day, afternoon, evening, after midnight, etc.), location (e.g., shopping mall, night club, restaurant, playground, office, church, etc.), time of year (e.g., Valentine's Day, spring/summer/fall/winter, Christmas Day, etc.), and/or characteristics of the users (e.g., age, relationship of users, etc.). For example, assume the shared music preferences of the first and second users include dance club music and soothing seventies music. During the day, the server 180 would choose the soothing seventies music, but during the night, the server 180 may choose to share the dance club music. That selection may change based on the location and/or time of day. If the shared music preferences of the first and second users include Iron Maiden and Bach, and the location where the music is to be played is an office environment, the server 180 would choose to share Bach. During Christmas, the server 180 would choose to share preferred Christmas songs over preferred love songs. During Valentine's Day, the server 180 would choose the preferred love songs. In another example, the first and second users may both enjoy listening to rap music with explicit lyrics and folk music. Because the first user 102 is a teenage student and the second user 104 is the student's teacher, the server 180 would choose to share the folk music, rather than the rap music.

In exemplary embodiments, the server 180 may also adjust the selected music based on the type of activity associated with the location of the jukebox device 130. For instance, music selected to be played in a pool room of a restaurant may be different from music selected to be played in a bar room of a restaurant. The server 180, in certain embodiments, may also restrict the volume of the music so that music in the one part of an establishment (e.g., eating area of a restaurant) is not as loud as music in another part of the establishment (e.g., the bar area of the restaurant).

In other embodiments, if the location where the jukebox device 130 is located (e.g., restaurant, bar, or club) is having a "country night," then the service provider server 180 may only select country songs from users' shared preferences and block all other songs that are not defined as appropriate for country night. In another example, a club owner has a hip-hop night on Wednesdays, beginning at 9:00 pm and ending at 4:00 am. At 9:00 pm on Wednesdays, the service provider server 180 may only select hip-hop music from users' shared preferences and block all other genres of music such as country music, classic rock, jazz, blues and oldies. The service provider server 180 may further limit the available selection of hard rock additional songs to "hip-hop-esque" hard rock songs. At 4:00 am, the service provider server 180 may go back to selecting all types of music, without limiting to just hip-hop music.

In yet another embodiment, the service provider server 180 adjusts the selected music based on the identity of the users. In some aspects of the present disclosure, the musical preferences of a user or a group of users may take precedence. That is, the musical preferences of all the users near the jukebox device 130 may not be given equal weight. For example, more consideration may be given to the musical preferences of a host of a party, attendees of a party, or a guest being celebrated (e.g., a user celebrating a birthday or anniversary) than to other users in the area of the jukebox device 130. In another example, the relationship between users in the group is factored in. If the users are all co-workers, more conservative music may be selected instead of heavy metal, even though the co-workers all like heavy metal. If the users are all males, more "manly" music may be selected as opposed to soft love songs, even though the users all like soft love songs, but maybe that preference is when the user is alone or with a spouse or significant other.

In various embodiments, the service provider server 180 may evaluate whether or not the selected music is appropriate to share. For example, if the shared musical preferences of the users in the vicinity of the jukebox device 130 contain only raunchy, loud music and the location of the jukebox device 130 is an office, then the server 180 would decide that the selected music is inappropriate and should not be played. In another example, the jukebox device 130 may be located in a banquet room in a restaurant where a wedding is taking place. If the shared musical preferences of the guests at the wedding only include sad, melancholy songs, the server 180 would likely decide that this type of music should not be played.

If the server 180 determines that the selected music can be shared, at step 212, the service provider server 180 transmits the selected music/playlist to the jukebox device 130. The jukebox device 130 retrieves the selected music and plays it.

The present disclosure describes systems and methods that improve the music experience of a plurality of users. The music played is based on the shared music preferences of the users in the area, rather than just a single user. The system examines various factors to determine what songs to play and whether or not it is appropriate to play the songs.

Figure 3:
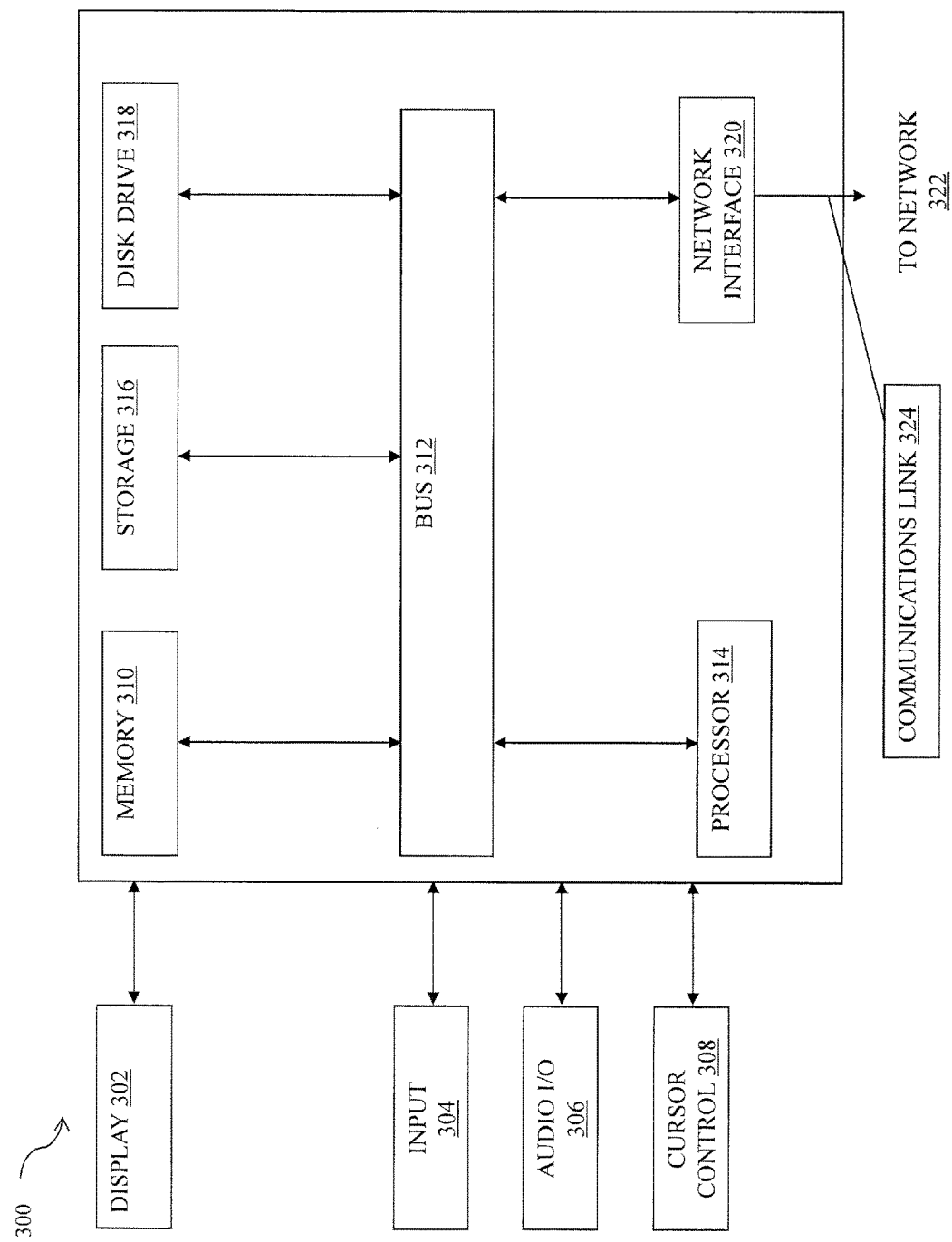
FIG. 3 is a block diagram of a system for implementing a device according to an embodiment of the present disclosure.

FIG. 3 is a block diagram of a computer system 300 suitable for implementing one or more embodiments of the present disclosure, including the first mobile device 120, the jukebox device 130, beacon 140, second mobile device 150, and the service provider server 180. In various implementations, the first mobile device 120, the jukebox device 130, beacon 140, and second mobile device 150 may comprise a mobile cellular phone, personal computer (PC), laptop, wearable computing device, etc. adapted for wireless communication, and the service provider server 180 may comprise a network computing device, such as a server. Thus, it should be appreciated that the devices 120, 130, 140, 150, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A music system, comprising:
   a non-transitory memory; and
   one or more hardware processors coupled with the non-transitory memory and configured to read instructions from the non-transitory memory to cause the music system to perform operations comprising:
   in response to detecting a first user device within a predetermined distance of a first beacon associated with a first jukebox device, identifying a first user corresponding to the first user device;
   determining first musical preference information associated with the first user based at least in part on prior purchases of tickets to music-related events made by the first user;
   determining, based on the first musical preference information and a previously determined second musical preference information related to a second user, shared musical preference information;
   accessing a first music library comprising a first plurality of audio files associated with the first jukebox device;
   identifying, from the first plurality of audio files in the first music library, a subset of audio files based on the shared musical preference information;
   generating a music playlist based on the identified subset of audio files;
   causing a playback of the music playlist by the first jukebox device;
   receiving, from the first user device, a song purchase request at a first instance of time;
   determining that the first user device is located within the predetermined distance of the first beacon associated with the first jukebox;
   in response to determining that the first user device is located within the predetermined distance of the first beacon associated with the first jukebox,
   determining a particular song from the music playlist played by the first jukebox device at the first instance of time; and
   processing a purchase of the particular song for the first user.

2. The system of claim 1, wherein the operations further comprise:
   accessing music stored on the first user device; and
   analyzing the music stored on the first user device, wherein the first musical preference information is determined further based on the analyzing.

3. The system of claim 1, wherein the operations further comprise:
   determining an identity of the first user;
   accessing music associated with the first user stored on a remote storage device based on the determined identity; and
   analyzing the music associated with the first user stored on the remote storage device, wherein the first musical preference information is determined further based on the analyzing.

4. The system of claim 1, wherein generating the music playlist is further based on information corresponding to at least one of a time of day, a time of year, a season, or a holiday.

5. The system of claim 1, wherein generating the music playlist is further based on at least one of a first location characteristic associated with a location of the first jukebox device, an event corresponding to the location, first characteristics corresponding to the first user, second characteristics corresponding to the second user, or relationship information corresponding to the first user and the second user.

6. The system of claim 1, wherein the operations further comprise:
    determining, for the first jukebox device, a first location characteristic based at least in part on a location of the first jukebox device;
    determining, based on the first location characteristic determined for the first jukebox device, a volume level corresponding to the playback of the music playlist; and
    adjusting a volume of the first jukebox device based on the determined volume level.

7. The system of claim 1, wherein the music playlist is generated further based on a first time of day, and wherein the operations further comprise adjusting the music playlist based on a second time of day.

8. The system of claim 1, wherein the first user is assigned a first weight and the second user is assigned a second weight, wherein determining the shared musical preference information is further based on the first weight and the second weight.

9. A method, comprising:
    in response to detecting a first user device within a predetermined distance of a beacon associated with a first speaker device, identifying, by one or more hardware processors, a first user corresponding to the first user device;
    determining, by the one or more hardware processors, first musical preference information associated with the first user based at least in part on prior purchases of tickets to music-related events made by the first user;
    in response to detecting a second user device within the predetermined distance of the beacon, automatically determining, by the one or more hardware processors, second musical preference information related to a second user corresponding to the second user device;
    determining, by the one or more hardware processors based on the first musical preference information and the second musical preference information, shared musical preference information;
    accessing, by the one or more hardware processors, a first music library comprising a first plurality of audio files associated with the first speaker device;
    generating, by the one or more hardware processors, a music playlist from the first plurality of audio files in the music library based on the shared musical preference information, wherein the generated music playlist comprises a subset of the first plurality of audio files identified based on the shared musical preference information;
    causing, by the one or more hardware processors, a playback of the music playlist by the first speaker device, wherein the first speaker device is different from the first user device and the second user device;
    receiving, by the one or more hardware processors from the first user device, a song purchase request at a first instance of time;
    determining, by the one or more hardware processors, that the first user device is located within the predetermined distance of the beacon associated with the first speaker device;
    in response to determining that the first user device is located within the predetermined distance of the beacon associated with the first speaker device, determining, by the one or more hardware processors, a particular song played by the first speaker device at the first instance of time; and
    processing, by the one or more hardware processors, a purchase of the particular song for the first user.

10. The method of claim 9, further comprising:
    accessing music stored on the first user device; and
    analyzing the music stored on the first user device, wherein the first musical preference information is determined further based on the analyzing.

11. The method of claim 9, further comprising:
    determining an identity of the first user;
    accessing music associated with the first user stored on a remote storage device based on the determined identity; and
    analyzing the music associated with the first user stored on the remote storage device, wherein the first musical preference information is determined further based on the analyzing.

12. The method of claim 9, wherein generating the music playlist is further based on information corresponding to at least one of a time of day, a time of year, a season, or a holiday.

13. The method of claim 9, wherein generating the music playlist is further based on at least one of a first location characteristic associated with a location of the first speaker device, an event corresponding to the location, first characteristics corresponding to the first user, second characteristics corresponding to the second user, or relationship information corresponding to the first user and the second user.

14. The method of claim 9, further comprising:
    determining, based on a first characteristic associated with a location of the first speaker device, a volume level corresponding to the playback of the music playlist; and
    adjusting a volume of the speaker device based on the determined volume level.

15. The method of claim 9, wherein the music playlist is generated further based on a first time of day, and wherein the method further comprises adjusting the music playlist based on a second time of day.

16. The method of claim 9, wherein the first user is assigned a first weight and the second user is assigned a second weight, wherein determining the shared musical preference information is further based on the first weight and the second weight.

17. A non-transitory machine readable medium having stored thereon machine-readable instructions executable to cause a machine to perform operations comprising:
    in response to detecting a first user device within a predetermined distance of a beacon associated with a first jukebox device, identifying a first user corresponding to the first user device;
    determining first musical preference information associated with the first user based at least in part on prior purchases of tickets to music-related events made by the first user;
    determining, based on the first musical preference information and a previously determined second musical preference information related to a second user within the predetermined distance of the beacon, shared musical preference information;
    obtaining data related to a first music library associated with the first jukebox device, wherein the first music library comprises a plurality of audio files;
    identifying, from the first plurality of audio files in the first music library, a subset of audio files based on the shared musical preference information;
    generating a music playlist based on the identified subset of audio files;

causing a playback of the music playlist by the jukebox device;

receiving, from the first user device, a song purchase request at a first instance of time;

determining that the first user device is located within the predetermined distance of the first beacon associated with the first jukebox;

in response to determining that the first user device is located within the predetermined distance of the first beacon associated with the first jukebox, determining a particular song from the music playlist played by the first jukebox device at the first instance of time; and processing a purchase of the particular song for the first user.

18. The non-transitory machine readable medium of claim 17, wherein the operations further comprise:

accessing music stored on the first user device; and analyzing the music stored on the first user device, wherein the first musical preference information is determined further based on the analyzing.

19. The non-transitory machine readable medium of claim 17, wherein the operations further comprise:

determining an identity of the first user;

accessing music associated with the first user stored on a remote storage device based on the determined identity; and analyzing the music associated with the first user stored on the remote storage device, wherein the first musical preference information is determined further based on the analyzing.

20. The non-transitory machine readable medium of claim 17, wherein generating the music playlist is further based on information corresponding to at least one of a time of day, a time of year, a season, or a holiday.

* * * * *